United States Patent
Eldred

(10) Patent No.: US 8,533,073 B2
(45) Date of Patent: Sep. 10, 2013

(54) ELECTRONICALLY IMPLEMENTED FLOORPLAN AUDITING SYSTEM AND METHOD

(75) Inventor: Cameron Eldred, Hanover, NH (US)

(73) Assignee: DealerTrack Data Services, Inc., Lake Success, NY (US)

(*) Notice: Subject to any disclaimer, the term of this patent is extended or adjusted under 35 U.S.C. 154(b) by 1460 days.

(21) Appl. No.: 11/799,237

(22) Filed: Apr. 30, 2007
(Under 37 CFR 1.47)

(65) Prior Publication Data
US 2008/0154669 A1  Jun. 26, 2008

Related U.S. Application Data

(60) Provisional application No. 60/796,215, filed on Apr. 28, 2006.

(51) Int. Cl.
*G06F 17/00* (2006.01)

(52) U.S. Cl.
USPC ........... 705/28; 705/7.22; 705/7.23; 705/7.36

(58) Field of Classification Search
USPC ......... 705/14.35, 35, 36 R, 38, 235; 707/949
See application file for complete search history.

(56) References Cited

U.S. PATENT DOCUMENTS

| | | | | |
|---|---|---|---|---|
| 5,262,941 A * | 11/1993 | Saladin et al. | | 705/38 |
| 5,323,315 A * | 6/1994 | Highbloom | | 705/38 |
| 5,699,527 A * | 12/1997 | Davidson | | 705/38 |
| 5,878,403 A | 3/1999 | DeFrancesco et al. | | |
| 6,112,190 A * | 8/2000 | Fletcher et al. | | 705/36 R |
| 2002/0198761 A1 | 12/2002 | Ryan et al. | | |
| 2003/0233278 A1* | 12/2003 | Marshall | | 705/14 |
| 2005/0256780 A1 | 11/2005 | Eldred | | |
| 2006/0277123 A1* | 12/2006 | Kennedy et al. | | 705/35 |
| 2007/0226131 A1* | 9/2007 | Decker et al. | | 705/38 |

* cited by examiner

*Primary Examiner* — Thomas Dixon
*Assistant Examiner* — Gerald Vizvary
(74) *Attorney, Agent, or Firm* — Goodwin Procter LLP

(57) ABSTRACT

An electronic method of auditing floorplan loans is provided. The floorplan loans are provided by a lending source to a plurality of vehicle dealers. The method includes, for each of the plurality of vehicle dealers, an entity other than the lending source or a dealer (i) retrieving the lending source's records corresponding to the dealer's floorplan loan; (ii) retrieving the dealer's internal financial records used by the dealer for tracking sales; (iii) comparing the lending source's records with the dealer's internal financial management records to determine a variance between the lending source's records and the dealer's records; and (iv) reporting the variance to the lending source.

10 Claims, 9 Drawing Sheets

| FIELD NAME | COMMENTS |
|---|---|
| VIN | VEHICLE IDENTIFICATION NUMBER - 17 CHARACTERS |
| ReceivedDate | DATE VEHICLE WAS RECEIVED INTO INVENTORY, PREFERABLY MM/DD/YY |
| StockNumber | STOCK NUMBER OF VEHICLE |
| COLOR | COLOR OF VEHICLE |
| NATURE | NEW / USED |
| MILEAGE (IF USED) | MILEAGE ON VEHICLE |
| SalesCost | SALES COST OF VEHICLE, INCLUDING ALL CLOSED ROs ETC. |

FIG. 3

| FIELD NAME | COMMENTS |
|---|---|
| VIN | VEHICLE IDENTIFICATION NUMBER |
| StockNumber | STOCK NUMBER OF VEHICLE |
| DealDate | DATE VEHICLES IS DELIVERED (MM/DD/YY OR MM/DD/YYYY) |
| SellingPrice | RETAIL OR WHOLESALE SELLING PRICE OF VEHICLE AS PRINTED ON PAPERWORK |
| SalesCost | ACCOUNTING FULL COST OF VEHICLE SOLD (NOT INCLUDING ANY SALES COMM. PACK) |
| GrossProfit | TOTAL PROFIT (FRONT AND BLACK) OF THE DEAL |
| DeliveredMileage | MILEAGE ON VEHICLE AT TIME OF DELIVERY AS SHOWN ON PAPERWORK |
| SaleType | RETAIL OR WHOLESALE INDICATOR (AN "R" OR "W" WOULD BE USEFUL) |
| BuyerName | FULL NAME OF BUYER, FIRST AND LAST IF POSSIBLE, OTHERWISE JUST LAST |
| ReceivedDate | DATE VEHICLE CAME INTO INVENTORY (MM/DD/YY OR MM/DD/YYYY) |
| COLOR | COLOR OF VEHICLE SOLD |
| ZIP | ZIP CODE (5 DIGIT) OF PRIMARY BUYER |
| BuyerAddress | FULL ADDRESS OF BUYER |

FIG. 4

| FIELD NAME | COMMENTS |
|---|---|
| VIN | VEHICLE IDENTIFICATION NUMBER |
| StockNumber | STOCK NUMBER OF VEHICLE |
| DealDate | DATE VEHICLES IS TO BE DELIVERED (MM/DD/YY OR MM/DD/YYYY) |

FIG. 5

| FIELD NAME | COMMENTS |
|---|---|
| VIN | |
| SellingPrice | |
| SalerCost | |
| DateofSale | |
| RetailLeaderName | |
| RetailLenderID | A MEMBER ID OF A LENDER THAT IS ALSO A PARTICIPATING MEMBER OF DealerWire SERVICES, OR ANY RECORDED ID ASSOCIATED WITH A NAME AND ADDRESS OF THE LENDER |
| LoanAmountRequested | |
| LoanTerm | |
| InterestRate | |
| SalesPrice-Loan REQUEST | |
| CASH ADVANCED | |
| Trade-In CREDIT | REDUCTION IN PRICE DUE TO TRADE-IN; FROM FINANCIAL AND INVENTORY RECORDS |

FIG. 6

| FIELD NAME | COMMENTS |
|---|---|
| VIN | |
| RetailLenderID | |
| LoanAmountRequested | |
| LoanAmountApproved | |
| DateLoan | |
| DateFundsDelivered | |
| DateFundsReceivedIntoDealerAccount | FROM DEALER FINANCIAL RECORDS |

FIG. 7

| FIELD NAME | COMMENTS |
|---|---|
| FLOORPLAN LENDER ID | ID ASSOCIATED WITH LENDER |
| FLOORPLAN LOAN NUMBER | LOAN IDENTIFIER NUMBER FROM LENDER |
| DealerID | DEALER TO WHICH LOAN WAS GIVEN |
| LoanAmount | |
| LoanDate | |
| LIST OF VINs FINANCED AND DATE EACH WAS ADDED TO FLOORPLAN LOAN | A SEPARATE FIELD IDENTIFYING EACH VIN WITH AN ASSOCIATED FIELD CORRESPONDING TO THE DATE OF THE ASSOCIATED VIN CAN BE PROVIDED |
| CurrentDate | |
| LoanBalance | CARS STILL FINANCED AS OF CURRENT DATE OF POLLING |
| LIST OF OUTSTANDING VINs | ASSOCIATED WITH EACH VIN, AS APPLICABLE, DATE RECORDING RETAIL |
| RECORDED DATES OF RETAIL LOAN FUNDING | LOAN FUNDING OBTAINED FROM PREVIOUS AUDIT |

ELECTRONICALLY IMPLEMENTED FLOORPLAN AUDITING SYSTEM AND METHOD

CROSS-REFERENCE TO RELATED APPLICATIONS

This application claims a benefit of priority to U.S. provisional application Ser. No. 60/796,215, filed Apr. 28, 2006.

TECHNICAL FIELD

This invention relates to vehicle inventory and loan management systems and, more particularly, to a system and method for lending sources to conduct computer-implemented audits of their collateral in connection to what is known as floorplan loans.

BACKGROUND OF THE INVENTION

Car dealers usually finance the acquisition of their inventory, especially new cars, by a loan, known as a floorplan loan. Floorplan loans, typically provided by commercial banks, are low cost loans that are secured by the inventory purchased with the loaned funds. When a vehicle is sold to a customer, and the dealer receives payment, the portion of the floorplan loan covering the sold vehicle comes due. Thus the amount of the outstanding floorplan loan at a given time depends on the cost of the dealer's unsold inventory at that time, i.e., on the amount paid by the dealer to the car manufacturer for the dealer's unsold and sold but not yet paid-for inventory.

The vast majority of consumers who purchase their vehicles from a car dealer finance the purchase with retail loans. Typically, the customer obtains the retail loan via the dealer, who in turn places the loan with a retail lender. In order to apply for a retail loan, the dealer must capture a customer's personal details, such as social security number, date of birth, address, and so on, as well as other data.

Although the customer typically drives away with the car within 24 hours of purchase, it can take several days or even a week before the retail loan is funded, and the dealer receives the funds corresponding to the retail loan. The floorplan loan on the sold vehicle usually becomes due as soon as the dealer receives the funds for the sale.

Banks, as well as other types of lending sources, make floorplan loans to car dealers at low rates of interest, in part because the loans are secured by the inventory purchased with the loan. When a dealer sells a vehicle and receives payment for the sold vehicle, the dealer becomes obligated under the floorplan contract to repay the floorplan lender the amount corresponding to the floorplan loan on the sold vehicle. It follows that the outstanding floorplan loan amount should decrease each time a dealer is paid for a sold vehicle.

Although most floorplan contracts permit dealers to delay repayment of their floorplan loans until the dealers actually receive the funds corresponding to customers' retail loans, they typically do not permit loan repayments to be deferred beyond this point. In practice, many dealers delay repayment on their floorplan loans beyond the normal deadline without knowing it, but a small proportion may delay deliberately because the delay gives a dealer working capital. Such delays, whether accidental or deliberate, are not in compliance with the floorplan loan agreement, reduces the lending source's collateral and may cost the lending source money.

In order to monitor compliance with the terms of the floorplan loan, the bank or other type of lending source holding the floorplan loan needs to audit the unsold inventory of the dealer to verify that the amount outstanding on the floorplan loan corresponds to the portion of the dealer's unsold inventory being financed by the lending source's floorplan loan. Most lending sources periodically conduct their floorplan audits by sending a representative to the dealer's showroom, where they can physically "see" each unsold vehicle.

U.S. Pat. No. 5,323,315 to Highbloom ("Highbloom") discloses a system and method for monitoring the status of items serving as collateral for securing financing. In particular, Highbloom discloses receiving financing information from a plurality of financing (lending) sources, and comparing the information from the different financing sources to determine whether a particular item of personal property simultaneously serves as collateral to secure financing from more than one financing source. The financing sources can include those financing floorplans and those providing consumer credit.

U.S. Publication No. US 2002/0198761 by Ryan et al. is directed to a method for determining a current demand for one or more categories or classes of vehicle for a dealer by obtaining information from suppliers identifying a supply of each of the vehicles for sale, designating a market for each class of vehicle for which demand exceeds a threshold value, and notifying the dealers who have a demand for the particular class of the market.

U.S. Pat. No. 5,878,403 to DeFrancesco et al. discloses a computer implemented automated credit application and routing system for selectively receiving and forwarding a credit application from a car dealer's computer system to at least one consumer funding source to obtain a loan for the purchase of a car from the dealer.

There is no system or method in the prior art, which provides a computer-implemented, floorplan auditing system which enables timely, inexpensive and accurate audits of the portion of a dealer's inventory financed by a floorplan loan.

SUMMARY

The present invention provides a computer-implemented floorplan auditing system which enables timely, inexpensive and accurate audits of a dealer's inventory financed by a floorplan loan. These improved audits are achieved by electronically accessing selected financial records maintained by the dealer, retrieving relevant records of a lending source's floorplan loan, and comparing the dealer's financial records with the floorplan loan records of the lending source to detect and identify any variances between the lending source's records and the dealer's records. The details of these variances are reported to the lending source.

In general, in one aspect, the invention features a computer-implemented method of auditing floorplan loans provided by a lending source to one or more vehicle dealers. The method involves: for each of the one or more vehicle dealers, an independent entity (not the lending source or a dealer retrieving the lending source's records corresponding to the dealer's floorplan loan) retrieving the dealer's (internal) financial records used by the dealer for tracking sales; comparing the lending source's records with the dealer's internal financial management records to determine a variance between the lending source's records and the dealer's records; and in some instances reporting the variance to the lending source.

In one embodiment, the variance is defined as a difference between a cost to the dealer of eligible inventory and an outstanding balance on the dealer's floorplan loan with the lending source. In an additional embodiment, the eligible inventory includes vehicles covered by the dealer's floorplan loan that are either unsold, or sold, but for which the dealer has not yet received funds.

In another embodiment, the entity retrieves the lending source's records by requesting the records or receiving records sent to it by the lending source. In yet another embodiment, the entity retrieves the dealer's internal financial records by requesting the records or receiving records sent to it by the dealer. In still another embodiment, the lending source's records are retrieved by downloading the records from a secure FTP site maintained by the lending source and the dealer's internal financial records are retrieved by a request transmitted over the Internet.

The present invention also relates to a computer-implemented method of auditing a floorplan loan, the floorplan loan being provided by a lending source to a vehicle dealer. The method includes an independent entity not including the lending source or the vehicle dealer: (i) retrieving the lending source's records relating to the floorplan loan; (ii) retrieving the dealer floorplan records of inventory related to the floorplan loan, the dealer floorplan records including records of funds received and recorded by the dealer related to the floorplan inventory; (iii) comparing the lending source's records with the dealer floorplan records to determine a variance between the lending source's records and the dealer floorplan records; and (iv) utilizing the variance to determine the results of the audit. The method can also include reporting the variance to the lending source.

In one embodiment, the method also includes the independent entity retrieving from the dealer retail lending records associated with the dealer's inventory, and enabling the lending source to view and analyze the retail lending records.

In another embodiment, the method also includes the independent entity retrieving used car inventory and sales history data from the dealer; analyzing the dealer's used car inventory and sales data to identify one or more categories of cars that are under-stocked; obtaining from a second dealer and/or an auction house a list of cars that are available for trade or sale; identifying cars on the list of cars that are in the one or more identified categories of under-stocked cars; and providing the dealer and the second dealer and/or the auction house computer access to the list of identified cars and their owners.

The present invention also provides an independent server-based system for enabling a lending source to conduct a computer-implemented audit of a floorplan loan, the floorplan loan being provided by the lending source to a vehicle dealer. The system includes a data collecting processor for communicating with a lending source computer and a vehicle dealer computer. The data collecting processor collects the lending source's records relating to the floorplan loan from the lending source computer and the dealer floorplan records of inventory related to the floorplan loan from the dealer computer. The dealer floorplan records includes records of funds received and recorded by the dealer related to the floorplan inventory.

The system also includes a database operably connected to the data collecting processor for storing the lending source's records and the dealer floorplan records collected by the data collecting processor, and a floorplan auditing module operably connected to the database and the data collecting processor. The floorplan auditing module is adapted to compare the lending source's records with the dealer floorplan records to determine a variance between the lending source's records and the dealer floorplan records and to utilize the variance to determine the results of the audit.

The system and method of the present invention advantageously identifies the dealer's own financial records as a source of floorplan inventory data that floorplan lending sources are able to rely upon. As discussed further below, dealers maintain this data accurately, in support of other operational objectives critical to their business. Accordingly, floorplan lending sources can trust this data, and forgo the onsite audit, or complement onsite audits with computer-implemented audits, reducing the frequency of required onsite, physical, audits.

BRIEF DESCRIPTION OF THE DRAWINGS

FIG. 3 is a representative table of data that is polled from the dealers for current vehicles in stock.

FIG. 4 is a representative table of data that is polled from the dealers for sold vehicles.

FIG. 5 is a representative table of the data that is polled from the dealers for deals that are worked but not sold.

FIG. 6 is a representative table of data including details of a retail loan applied.

FIG. 7 is a representative table of data regarding approved, funded, and received loans.

FIG. 8 is a representative table of data polled from a floorplan lender for a particular floorplan loan to a dealer.

FIG. 10 shows a screen shot of a page for Used Car Inventory in one embodiment of the present invention.

DETAILED DESCRIPTION

The present invention can be better understood from the following description of preferred embodiments, taken in conjunction with the accompanying drawings. It should be apparent to those skilled in the art that the described embodiments of the present invention provided herein are merely exemplary and illustrative and not limiting. All features disclosed in the description may be replaced by alternative features serving the same or similar purpose, unless expressly stated otherwise. Therefore, numerous other embodiments of the modifications thereof are contemplated as falling within the scope of the present invention and equivalents thereto.

System Overview

At least three parties are involved in the floorplan auditing and reporting system of the present invention: a financial lending source that has extended a floorplan loan to a car dealer for at least a portion of the dealer's existing floorplan, an intermediary who manages and operates the floorplan auditing and reporting system, and a car dealer that has obtained a floorplan loan from the financial lending source. It should be understood that although the examples provided herein are directed to loans for financing the inventory of car dealerships, the system and method of the present invention can also be adapted for auditing any collection of retail merchandise sold by a retailer and similarly funded by a lending source, including, but not limited to vehicles, RVs, construction equipment, boats, and aircraft.

The floorplan auditing and reporting system of the present invention is a computer-implemented system for auditing floorplan loans, which receives and transfers records from computer to computer over communications medium such as the Internet, for example, from a floorplan lending source to a dealer's accounts. Accordingly, the term "electronic" is used herein interchangeably with or in addition to "computer" or "computer-implemented."

Figure 1:
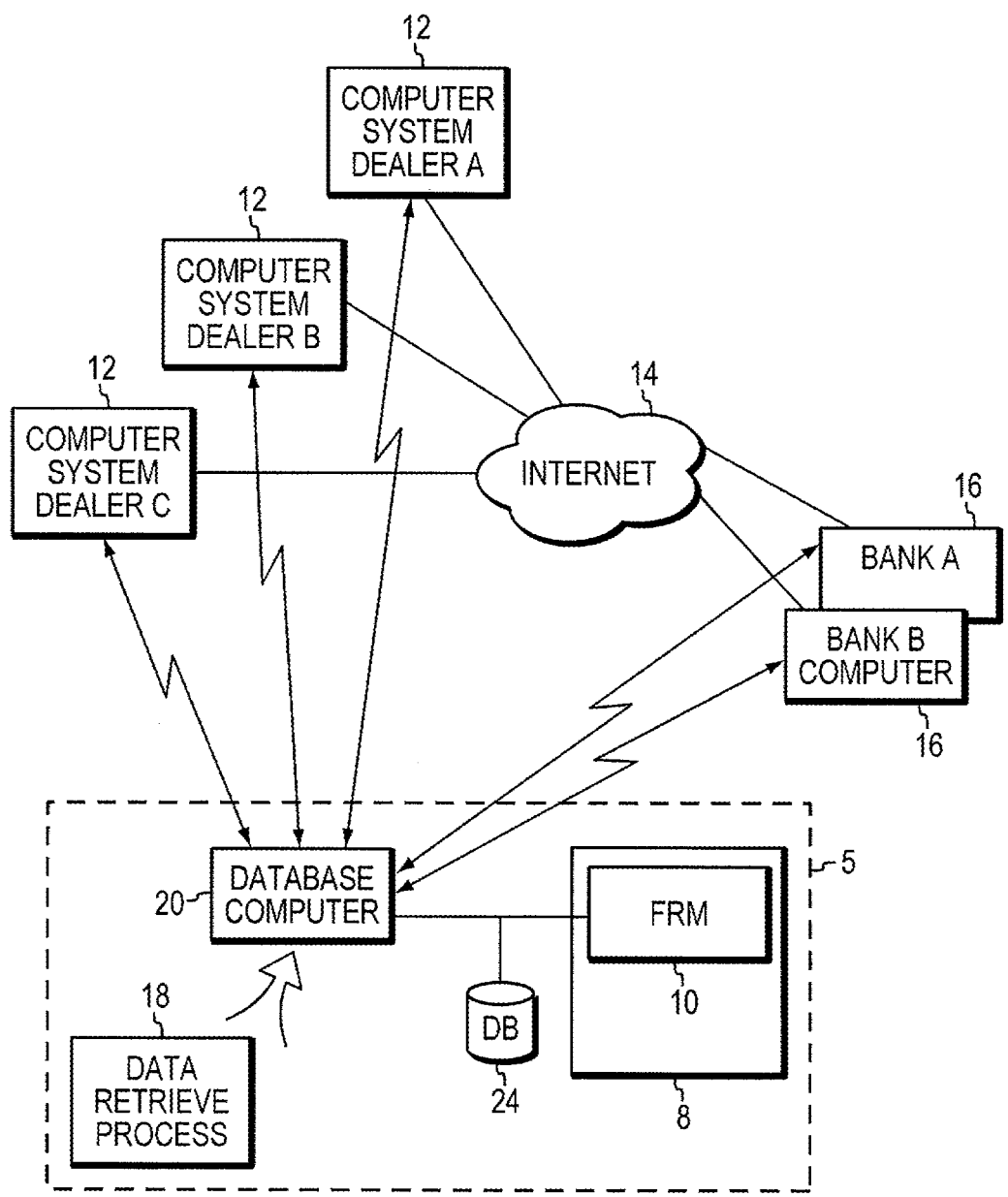
FIG. 1 is a block diagram of an embodiment of a floorplan loan auditing and reporting system of the present invention.

Referring to FIG. 1, a system of the present invention includes an intermediary server system 5, also referred to herein as Dealer Management System (DMS) 5, that communicates directly with both dealers' computer systems 12 and with computer systems of financial lending sources providing the floorplan loans 16, referred to herein as the floorplan lending sources or floorplan lenders, via the Internet 14. Computers 12 are physically located at the sites of used car and new car dealers who have signed up as members of a group of dealers to which the intermediary, referred to herein as DealerWire, provides the floorplan auditing services. Member dealers can also sign up for a multitude of additional online tools and services offered by DealerWire at their option. The group of dealers can include both independent and affiliated dealers. The subscribed-to services and tools are preferably accessible to the member dealers using computers 12 through a browser interface that runs on computers 12. Members access the services and tools through a password protected website.

Computers 16 are physically located at sites accessible to appropriate personnel at the floorplan lending sources who have signed up as members of a group of lending sources to which DealerWire provides the floorplan auditing services. The floorplan lending sources can include commercial banks, captive financing sources, credit unions, or any other lending sources which can benefit from a computer-implemented floorplan auditing and reporting system.

In one embodiment, member lending sources can also sign up for a multitude of additional online tools and services offered by DealerWire at their option, including tools aimed at providing the floorplan lending source with an opportunity to assess the nature of the dealer's business and to offer competitive consumer retail loans in real time to a dealer. The subscribed-to services and tools are also preferably accessible to the member floorplan lending sources using computers 16 through a browser interface that runs on computers 16.

The intermediary server system or DMS 5 includes a central processor 8 which implements a floorplan reporting system via software floorplan reporting module (FRM) 10 running on the DMS server 5, and preferably implements the FRM 10 using an application service provider (ASP) model.

Referring still to FIG. 1, FRM 10 is operably connected to a database computer processor 20 and to a database storage system 24 which includes a database of all of the sales, inventory and other information that the DMS 5 periodically collects from the dealer computer systems 12 and records collected from the floorplan lending sources 16. All records are retrieved using a data retrieval process 18 that runs on the database computer processor 20 and are stored in the database of database storage system 24.

Database computer processor 20 can be part of the same server system of the DMS 5 that implements the FRM 10. For example, database computer processor 20, also referred to herein as data collecting processor, can be a software module running on central processor 8. Alternatively, database computer processor 20 can be a separate processor, and can also be part of a separate computer system for data storage, which is accessible to and operably connected to central processor 8 and to any software modules adapted to support the on-line tools and services offered to corresponding subscribers, including the FRM 10, which require access to the retrieved data. Accordingly, database storage system 24 can also be locally or remotely located with respect to processor 20 and/or with respect to FRM 10.

The data collecting processor 20 preferably retrieves data by periodically communicating over private communication channels with each of the computers 12 at the dealer sites and with each of the computers 16 at the floorplan lending sources. Data collecting processor 20 can also communicate with other third party sites that subscribe to DealerWire's services, to download all relevant data and information that is needed to support the services that DealerWire provides to its members. The data collecting processor 20 also takes the downloaded and received data and populates various tables that are maintained in the database of data storage system 24 for providing the various online tools and member services offered by DealerWire.

Data Retrieval Process

According to a system and method of the present invention for providing computer-implemented floorplan auditing services, for each floorplan lending source, the database collecting processor 20 implements data retrieval process 18 to access the floorplan loan records associated with each dealer which currently has a floorplan loan from the particular floorplan lending source. Any appropriate method for secure data retrieval known to those skilled in the art can be used. For example, the floorplan lending source 16 can electronically enter or upload the appropriate records at the time an audit is requested, or it 16 can regularly upload or post new and edited records to a remote secure site, such as a secure FTP site, for later retrieval by database collecting processor 20 at the time of the request and/or by a scheduled automated polling process. The floorplan lending source computers 16 can also have the ability to push their floorplan data to data collecting processor 20 when updated data is available rather than respond to a request for data from the intermediary.

The DMS 5 also polls each of the member dealer computer systems 12 via the Internet 14, preferably on a daily basis and again at the time a computer-implemented auditing report is requested, and retrieves at least the portion of dealer sales and financial data records related to the most recent floorplan records obtained from each floorplan lending source. Other embodiments are considered within the scope of the invention. For example, the dealer can initiate the transfer of his financial records, rather than wait for loan FRM 10 to retrieve the data. In other words, the dealer can push the financial records to the intermediary rather than wait for the intermediary to pull the records. FRM 10 conducts a computer-implemented floorplan audit at the floorplan lending source's request, or on a regular scheduled basis at the option of the lending source, by comparing the retrieved dealer's records with the retrieved requesting lending source's floorplan records. A report is then provided to the lending source for each of the dealers whose floorplan the lending source at least partially finances. Reports can be appropriately tailored to the lending source's specifications, providing as much detail from the accessible records as desired.

Figure 2:
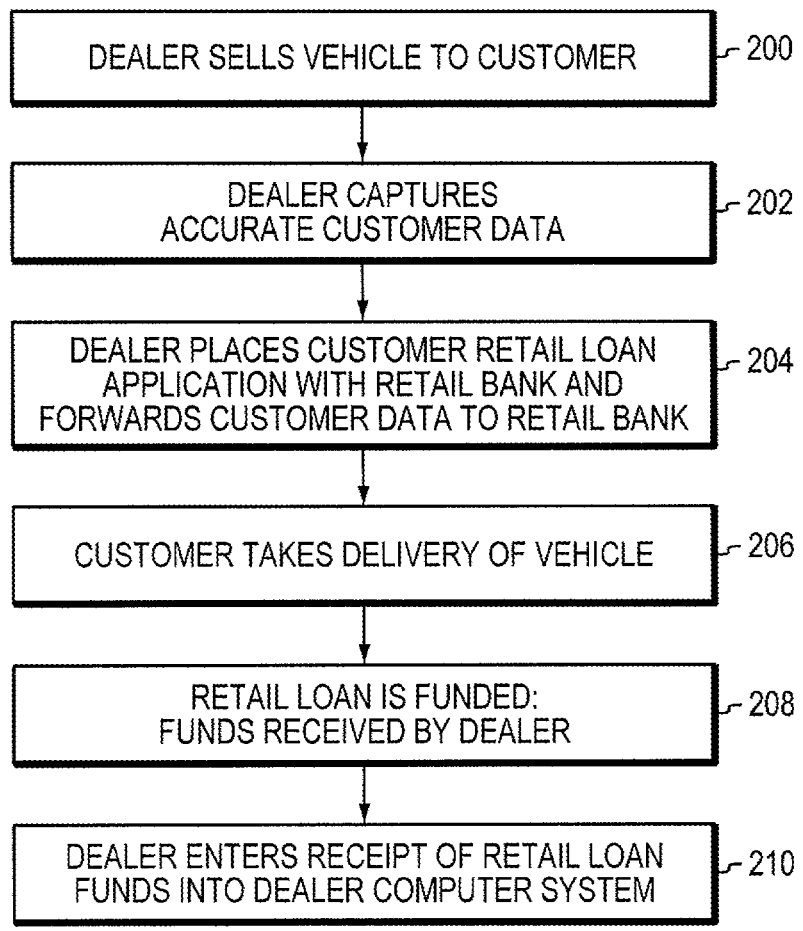
FIG. 2 is a representative flow diagram showing the steps involved when a customer requiring a retail loan purchases a vehicle.

Records and Data for Implementing the Computer-Implemented Floorplan Auditing System FIG. 2 illustrates what happens at a dealership when a customer purchases a vehicle. Once a dealer closes the sale 200, the dealer captures the customer's personal data 202. The dealer requires this information both for his own records, and possibly also for the purposes of seeking retail financing for the customer. The dealer captures the data as accurately as possible since even a single error in the customer's data can prevent smooth and rapid processing of a requested retail loan and delay the dealer's receipt of funds for a car that has already been delivered to the customer.

When the dealer has the customer information, loan amount, vehicle details, and any other required data in hand, the dealer places the retail loan, and forwards the customer's data to the retail lender 204. Typically, as soon as the dealer completes the paperwork, obtains the plates, obtains any down payment that might typically be required, and receives confirmation from the retail bank that the loan has been approved, the customer takes delivery of the vehicle 206. This usually occurs within 24 hours of closing the sale. Usually within a week of the loan application, the retail bank funds the retail loan by forwarding funds to the dealer 208. When the check is received, or the funds are electronically transferred from the lender, the dealer promptly records the transaction and gets the money into its banking account. Furthermore, the dealer's in-house computer system requires that the receipt of funds and deposit be accounted for in accounts receivable records. The dealer's bookkeeper enters receipt of the funds 210 by crediting the transaction that was initiated when the car was delivered and the receivable from the bank maintaining dealer's banking account was set up on the books. This entry creates the electronic evidence that the funds have actually arrived.

The dealer's financial records relating to floorplan inventory, including funds actually received and recorded by the dealer for floorplan inventory, are referred to herein as "dealer floorplan records." Such records contain at least enough information to identify when such funds, and in what amount, are received by the dealer, and also include data to associate a particular dealer floorplan record with a vehicle identifier, such as a VIN number, so that such records can be associated with a particular floorplan loan.

By directly accessing the dealer's financial records associated with particular vehicles being financed by one of the floorplan lending sources, including at least the so-called floorplan funds receivable records, the FRM 10 can conduct an updated and accurate computer-implemented floorplan audit at any time at the request of the floorplan lending source. Unlike prior art systems, because the FRM 10 uses data from the dealers' financial records rather than from a retail lender's records, the accuracy of the audit does not depend on whether or not the retail lender used by the customer participates in the electronic auditing service, or on whether or not the customer used any retail lender to finance the vehicle purchase. In addition, because the FRM 10 has access to the actual date funds are received into the dealer's accounts, delays that can occur between the date that funds are sent by a retail lender and the date the funds are actually received into the dealer's account are not an issue.

Accordingly, database processor 20 is advantageously adapted to retrieve from each dealer all the vehicle data required to measure compliance with a floorplan loan. This information is used to populate appropriate tables in database 24 for use by FRM 10 in performing the floorplan audits. Referring to FIG. 3, preferably, the data polled includes the vehicle identification number (VIN), the "received date" or the date the vehicle was received into inventory, the "nature" of the car (new or used) and the car mileage (if used), and the cost to the dealer. The stock number, color, and other details, such as type of transmission, may also be polled. Referring to FIG. 4, the data collecting processor 20 also polls sales data, including the date of sale, the selling price, the customer name, and the customer address. Referring to FIG. 5, data is also polled from dealers regarding vehicles for which a sale is anticipated, but not yet effected. In addition, details of a retail loan or loans applied for, as shown in FIG. 6 can also be polled, as well as data regarding approved, funded, and received loans, as shown in FIG. 7. Though these tables are only representative tables, it is clear that at the least, the portion of a dealer's financial records recording funds received in any form (funded retail loan, cash, or value for trade-ins) for any car sold, identified by its VIN number and optionally its stock number, is preferably polled for use by FRM 10.

Referring again to FIG. 1, data collecting processor 20 also pulls the floorplan lender's data records from the floorplan lenders' systems 16, or from secure FTP sites to which the data was posted. A representative table of data polled from a floorplan lender for a particular floorplan loan to a dealer is shown in FIG. 8. The data includes at least a dealer identification number, vehicle identification numbers, the dates each vehicle was added to the floorplan loan, and dates of retail loan funding. Data relating to all floorplan loans can be polled at one time and sorted according to the field identifying the dealer to which the loan is provided, or the data can be sorted initially by polling only those loans outstanding for a particular dealer.

FRM 10 places the data retrieved from the floorplan lenders 16 in appropriate fields so that it can compare each of the floorplan lender's floorplan records with corresponding data retrieved from one of the dealer systems 12 for which an electronic audit is being conducted. Of course, an audit can be conducted for each dealer which obtains a floorplan loan from a particular floorplan lender, either automatically, or upon request. Using standard techniques known to a person of ordinary skill in the art, FRM 10 then computes the variance between the lender's records and the dealer's records, and generates an up-to-date floorplan audit. More specifically, the audit involves comparing the cost to the dealer of the eligible inventory covered by his floorplan loan, and the actual outstanding balance on the floorplan loan. The eligible inventory includes the vehicles covered by the floorplan loan that have not yet been sold, as well as the vehicles covered by the floorplan loan that have been sold but for which the dealer has not yet received funds. If the dealer is in full compliance with the terms of the floorplan loan, the dealer cost of the eligible inventory will match the outstanding floorplan loan amount. Thus system 10 provides the floorplan lending source with an inexpensive, timely, accurate, and less fraud-prone way of conducting floorplan audits.

Practical Considerations in Initializing and Implementing a Floorplan Auditing System Different dealers will likely have different inventory and financial recording systems. Accordingly, data collecting processor 20 is designed to accommodate the variations between the different systems so as to be able to retrieve the information it needs from each dealer, and convert it into a format compatible for the FRM 10 to perform a comparison with the lenders' data. The appropriate accommodation can be made when a particular dealer initializes its subscription to the floorplan auditing and reporting services. A representative of the service provider (DealerWire) can ask the dealer for information about the sales and financial software he is using and "tune" the software 18 implemented by processor 20 used to collect data to the dealer's system and configuration. The tuning can involve selecting the particular data organization and/or data format that corresponds to that of the dealer's system. The loan reporting provider then performs a test run to check that the DMS 5 is able to retrieve the required data in an accurate and complete manner. Once set up, DMS 5 can retrieve data from dealer system 12 at regular intervals, such as each business day, without operator intervention.

The FRM 10 is also designed to alert operators as soon as it fails to retrieve dealer data for any reason. This situation can arise when the dealer or the dealer's software provider changes some aspect of the dealer system. For example, the dealer may alter naming conventions of dealer computer system 12, in which case FRM 10 may be unable to find a field requires. When this happens, the system alerts an operator who can correct the problem by updating the system's naming convention records.

Advantages to Dealers and Lenders

The floorplan auditing and reporting services provided by the FRM 10 as part of DMS 5 can also provide a marketing advantage to any floorplan lender that also wishes to develop its retail loan business with a dealer. Retail loans to car purchasers are usually of interest to a retail loan source, particularly to a commercial bank or credit union, since retail loans are generally more lucrative than floorplan loans to these financial institutions. Any floorplan lender with access to the DMS 5 including floorplan reporting module 10 can optionally have access to a dealer's real time retail loan status, providing the floorplan lending source with a valuable tool for supporting its retail loan marketing efforts to dealers.

With such access, the floorplan lending source can view the history of the dealer's sales, the types of retail loans it has secured, and the customer's retail loan sources, for example, commercial banks or credit unions, with which the retail loans have been placed. It can also assess the nature of the dealer's business—both the types of vehicles sold and the nature of the customers—so as to gain valuable risk assessment data, which may enable it to offer highly competitive retail loans. Furthermore, system 10 may place a floorplan lending source in a position to offer retail loans in real time to a dealer, which can increase the speed and efficiency of the dealer's sales process.

A dealer may be reluctant to allow its business data to be used by a floorplan lending source for a purpose unrelated to the floorplan loan. The lending source can overcome this reluctance and maintain the dealer's goodwill with a variety of incentives. Examples of incentives include a ¼ point reduction in the dealer's floorplan interest rate, access to a suite of analytic tools, such as those described in U.S. patent application Ser. No. 10/846,961, the disclosure of which is incorporated herein by reference, which provide an up-to-date inventory summary, a table breaking down the aging of floorplan units, consultation with dealers regarding the competitiveness of their current retail loan terms, or an increased spread on a retail loan (the spread is the difference between the interest rate charged by the dealer to the customer and the interest rate actually paid to the customer's retail loan source—the difference is typically profit for the dealer).

Another incentive is an offer of remarketing services, giving the dealer preferential access to cars coming off lease, repossessed vehicles, or vehicles released by rental car companies. Such offers can be tailored to the dealer's trailing sales so that offers are biased to models that are popular with the dealer's clientele. In yet another incentive, a marketing lending source offers to identify reverse inventory imbalances. These can result from car manufacturers tying the sale of popular vehicles desired by the dealer to less easily sold vehicles that the manufacturer wants to get rid of. A lending source with access to DMS 5 and the floorplan reporting data used by FRM 10 can discover which dealers may have a demand for such "tied" cars, and identify sales that would be economically advantageous both to dealers with a demand for the tied cars and for those with an excess of tied cars.

Protecting Selective Access of Different Services to Subscribers of the DMS

In one embodiment, in order to provide various analytical tools and services to member subscribers, the DMS 5 can maintain a file system that assigns access privileges to the various records retrieved and stored in database 24 according to a hierarchical or tiered approach well-known to those skilled in the art. For example, every member or user of services offered by the DMS 5 is ascribed a unique ID and is also assigned as a member of at least one of several groups, such as the group "Dealer" or the group "Floorplan Lenders." Members may be part of more than one group; for example, some Floorplan Lenders can also belong to the group of "Retail Loan Providers." Additional groups that may be included are third party auction houses or other outside parties for the purposes of registering a car for auction.

Accordingly, the same data could be polled from all dealers and from all floorplan lenders, for example, and stored in records with access privileges assigned in accordance with the services each member subscribes to. For example, if a dealer has agreed to allow participating member lending sources access to its real time retail loan status, read access privilege to the group Retail Loan Providers is assigned to all relevant sales records retrieved by processor 20 from the dealer, allowing use of such records by analysis and reporting tools and services subscribed to by the Retail Loan Providers.

Figure 9:
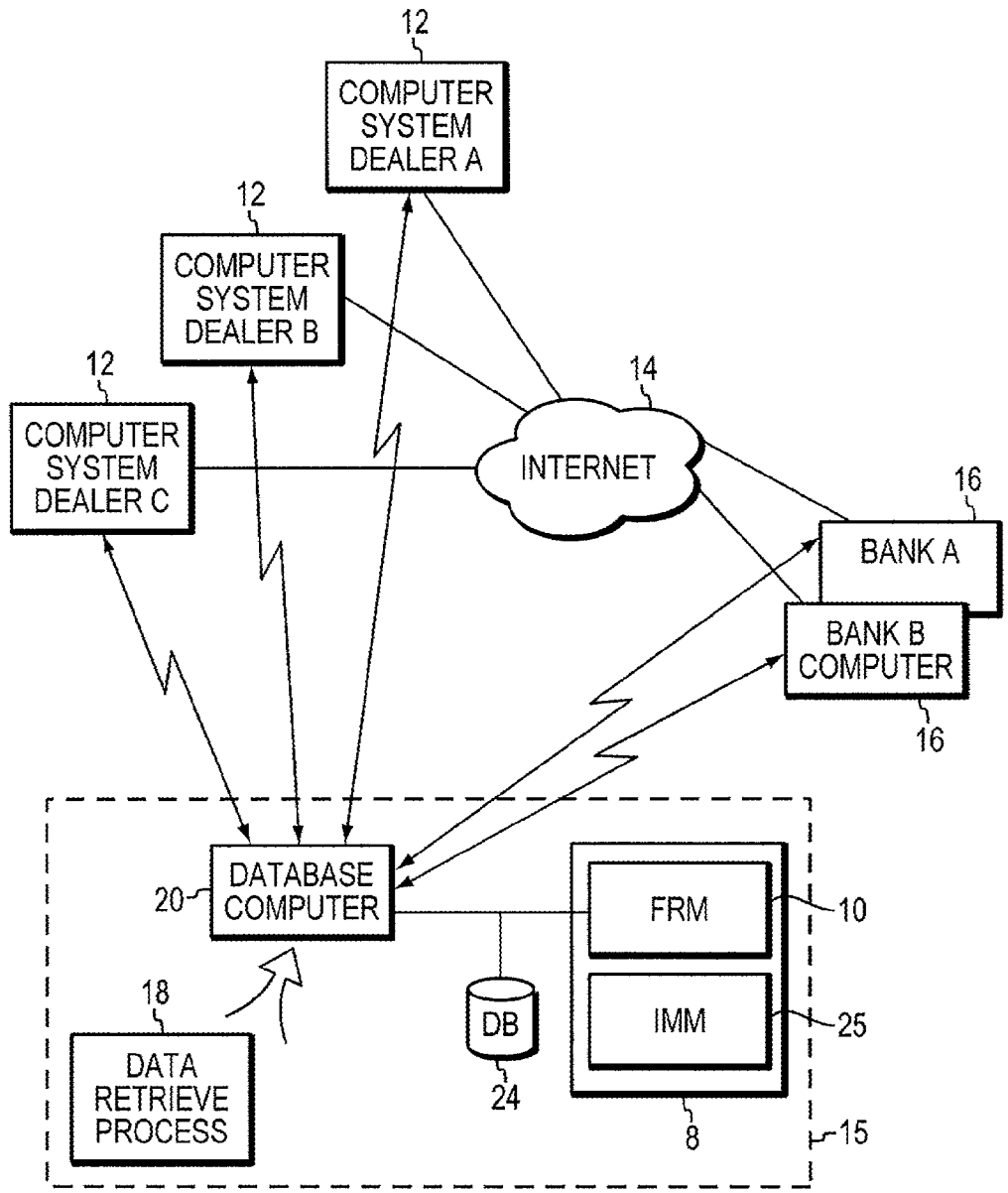
FIG. 9 is a block diagram of an embodiment of a dealer management system including a floorplan loan auditing system and inventory management tools.

In one embodiment shown in FIG. 9, a Dealer Management System (DMS) 15 selectively providing additional services to its members includes the floorplan audit and reporting module 10 and an inventory management system or module (IMM) 25 implemented by central processor 8. The services and tools that can be subscribed to by the member dealers 12 and the member lending sources 16 are expanded to include inventory analysis tools that provide mutually advantageous economic value for the members on both sides of the transaction. In particular, the inventory-related functionality of IMM 25 falls into three distinct categories: Inventory Buy/Sell Facilitation, Inventory Control and Valuation, and Inventory Analysis. With regard to Inventory Buy/Sell Facilitation, the IMM 25 application enables member dealers who subscribe to a Dealer-to-Dealer trading/transaction service to search for, and trade, vehicles with one another at lower transaction costs than are typically achievable at live auctions.

With regard to Inventory Control and Valuation, the IMM application provides an accurate and flexible inventory tracking tool and provides accurate and timely vehicle appraisal and valuation service. The technology provides asset valuations that reflect prices from accounting book values updated daily. With regard to Inventory Analysis, the IMM application provides inventory analysis tools for used cars that are updated daily to provide reliable asset management recommendations. Furthermore, it provides tools that enable dealers to perform sensitivity analysis by easily manipulating days supply targets and sales history date ranges.

To implement the DMS 15 including inventory management services, data retrieval process 18 takes data from different computer systems servicing different franchises and dealers, preferably assigns appropriate user and group read, write and executable access privileges to files according to each member's subscription plan, and organizes the data into a consistent database that can be appropriately used by the member dealers. The views of the data through the user's browser are tailored depending on what data is being viewed and depending on whose data it is. So, for example, a dealer subscribing to the Dealer-to-Dealer trading service can see all of its information but can only see a limited portion of the information of other dealers subscribing to the same service. Again, such limited and tailored access can be achieved by enabling read access privileges to all related files belonging to a member of the Dealer-to-Dealer group to all other members of the Dealer-to-Dealer group.

IMM 25 also enables the dealer members to perform customized analysis and queries on their data. The tools and the results are presented on the website for use by dealership personnel to make more intelligent wholesale inventory buying and selling decisions.

Data retrieval process 18 preferably polls member inventory and sales history data nightly by connecting to the various dealership computer systems via a dial-up modem, and automatically retrieves, cleanses, organizes, and deposits the data into the database.

Data retrieval process 18 pulls sales history for the preceding one-year period at initial set up. Then, as time passes it archives months that are older than twelve months. A graphical user interface (GUI) makes available data for the previous twelve months of activity. IMM 25 can run reports on history older than one year.

Through this data retrieval process, vehicle inventory information is organized and stored on the DealerWire system. Thus, members can manage their vehicle inventories online, search for vehicles available for sale in the inventories of subscribers to the Dealer-to-Dealer service through the IMM and view information about the owner of that vehicle. Also, members can view analysis performed on their own vehicles. This analysis can be used to help dealers make informed inventory management decisions.

Figure 10:
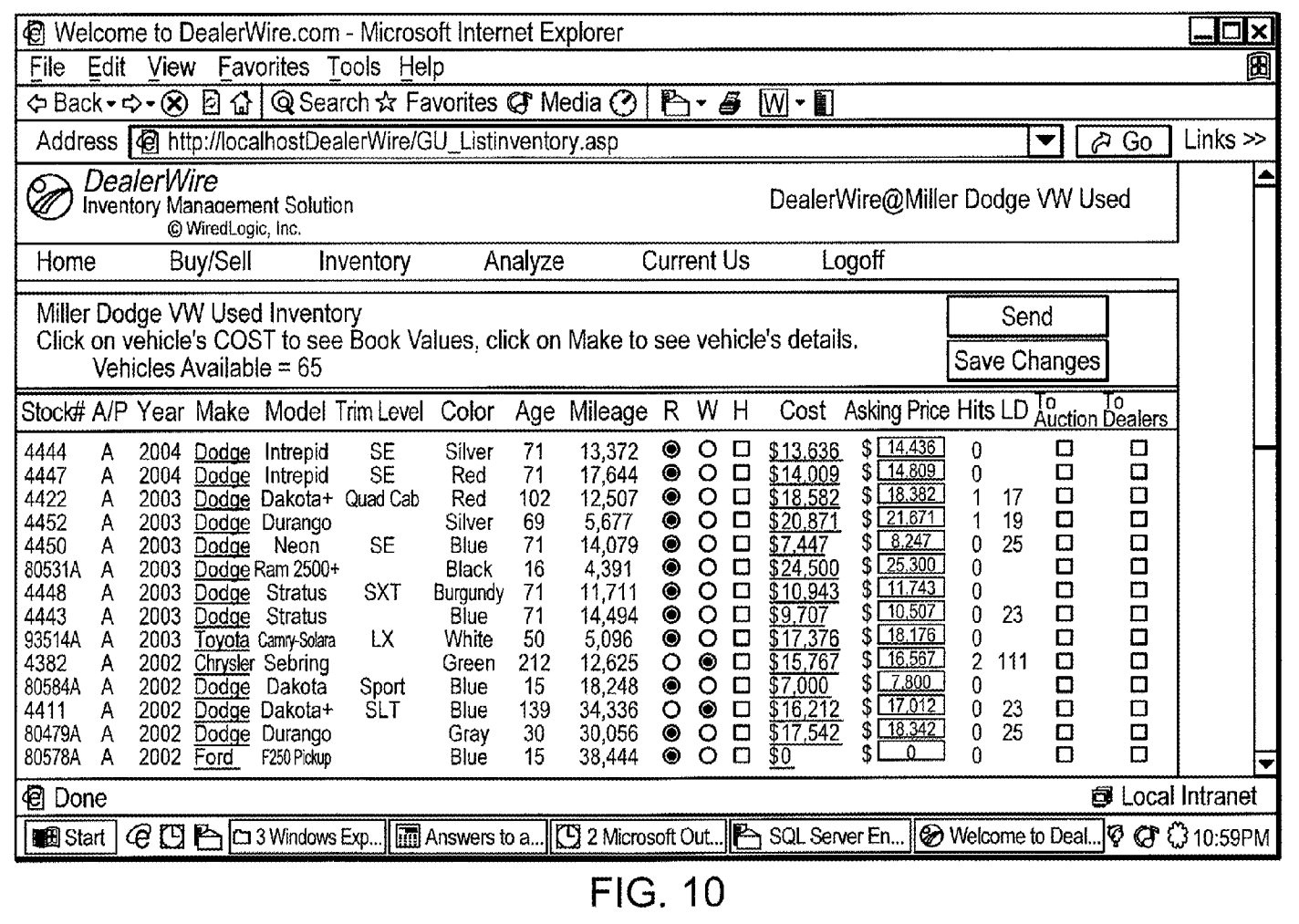

Additional details of the IMM, also referred to as the Inventory Management System (IMS), is described in U.S. patent application Ser. No. 10/846,961 by Eldred, the disclosure of which has been incorporated in its entirety herein by reference. In particular, the Eldred application discloses an IMS that can be used to analyze a dealer's overstocked and understocked classes of vehicles in its current inventory and to enable the dealer to take corrective action. For example, a screen is provided as a tool to identify vehicles to send to auction. Referring to FIG. 10, the DMS 15 of the present invention provides a Used Vehicles screen listing all of the used vehicles in that dealer's inventory that might be eligible for wholesale. It also lists specific information for each of the listed vehicles such as Stock No., Year, Make, Model, Trim Level, Color, Age, Mileage, Cost, Asking Price, Hits (i.e., the number of times, that other dealers have been notified of that vehicle in their searches) and LD (number of days since last deal). Each entry can be associated with a "To Auction" check box and a "To Dealers" check box, which enables the user to select that vehicle for electronic enrollment in a third party auction and/or to make the vehicle data available to other dealers that subscribe to the Dealer-to-Dealer trading services.

Accordingly, a Dealer Management System is provided that allows floorplan lending services to conduct electronic floorplan audits, advantageously reducing the floorplan lender's auditing costs since they replace onsite visits, which consume a lot of employee time. Floorplan audit errors, such as those stemming from the uncertain status of showroom vehicles, are also reduced. Uncertain status can arise when a car may still be in the showroom even if it is sold if, for example, the customer has not yet taken delivery; alternatively, a car may be out of the showroom even if it is unsold if, for example, it is out on a test-drive. The system and method of the present invention also reduces susceptibility to fraud that can be introduced by deliberate mischaracterization of inventory status. For example, a sold car could be temporarily retrieved from a customer for "servicing" on the day of an onsite audit, thus deceptively inflating the number of "unsold" vehicles. Concurrently, the system can include inventory management tools for use by the dealer in optimizing its inventory and retail loan analysis tools for use by the lender. Consequently, the system and method of the present invention encourages a partnership between lender and dealer, both of which benefit from the other's success.

Although illustrative embodiments of the present invention have been described herein with reference to the accompanying drawings, it is to be understood that the invention is not limited to those precise embodiments, and that various other changes and modifications may be applied therein by one skilled in the art without departing from the scope or spirit of the invention.

What is claimed is:

1. A computer-implemented method of auditing a floorplan loan, said floorplan loan being provided by a lending source to a vehicle dealer, said method comprising:
   (i) retrieving, using a configured processor, the lending source's records relating to said floorplan loan;
   (ii) retrieving, using a configured processor, the dealer floorplan records of inventory related to said floorplan loan, said dealer floorplan records including records of funds received and recorded by said dealer related to the floorplan inventory;
   (iii) comparing, using an audit module, said lending source's records with said dealer floorplan records to determine a variance between said lending source's records and said dealer floorplan records; and
   (iv) determining, using an audit module, the results of the audit utilizing at least in part said variance;
   (v) retrieving, using a configured processor, used car inventory and sales history data from said dealer;
   (vi) analyzing, using a configured processor, said dealer's used car inventory and sales data and a target inventory value to identify one or more categories of cars that are understocked;
   (vii) obtaining, using a configured processor, from a second dealer and/or an auction house a list of cars that are available for trade or sale;
   (viii) identifying, using a configured processor, cars on said list of cars that are in the one or more identified categories of understocked cars; and
   (ix) providing, using a configured processor, computer access to said dealer and to said second dealer and/or said auction house to the list of identified cars and their owners.

2. The method of claim 1, further comprising reporting, using an audit module, said variance to said lending source.

3. The method of claim 1, wherein said variance is a difference between a cost to said dealer of eligible inventory and an outstanding balance on the dealer's floorplan loan with said lending source.

4. The method of claim 3, wherein said eligible inventory comprises vehicles covered by said dealer's floorplan loan that are either unsold, or sold but for which said dealer has not yet received funds.

5. The method of claim 1, wherein retrieving the lending source's records comprises retrieving the lending source's records by one of (i) requesting said lending source's records utilizing a network interface and (ii) retrieving records sent to it by said lending source and stored in a computer-readable memory.

6. The method of claim 1, wherein retrieving said dealer floorplan records comprises retrieving said dealer floorplan records by one of (i) requesting said dealer floorplan records and (ii) receiving records sent to it by said dealer.

7. The method of claim 1, wherein retrieving said lending source's records comprises downloading the records utilizing a network interface from a secure file transfer protocol (FTP site maintained by said lending source.

8. The method of claim 1, wherein retrieving said dealer floorplan records comprises retrieving said dealer floorplan records by transmitting a request over the Internet utilizing a network interface.

9. The method of claim 1, further comprising retrieving, using a configured processor, from said dealer retail lending records associated with the dealer's inventory, and enabling said lending source to view and analyze said retail lending records.

10. An independent server-based system for enabling a lending source to conduct a computer-implemented audit of a floorplan loan, said floorplan loan being provided by said lending source to a vehicle dealer, said system comprising:

- a data collecting processor for communicating with a lending source computer and a vehicle dealer computer, said data collecting processor collecting the lending source's records relating to said floorplan loan from said lending source computer and the dealer floorplan records of inventory related to said floorplan loan from said dealer computer, said dealer floorplan records including records of funds received and recorded by said dealer related to the floorplan inventory;
- a database operably connected to said data collecting processor for storing said lending source's records and said dealer floorplan records collected by said data collecting processor;
- a floorplan auditing module operably connected to said database and said data collecting processor, said floorplan auditing module adapted to compare said lending source's records with said dealer floorplan records to determine a variance between said lending source's records and said dealer floorplan records and to utilize said variance to determine the results of the audit;
- said data collecting processor collecting used car inventory and sales history data from said dealer computer and storing said car inventory and sales history data in said database;
- an inventory analysis module operably connected to said database and said data collecting processor, said inventory analysis module adapted to analyze said dealer's used car inventory and sales data and a target inventory value to identify one or more categories of cars that are understocked;
- said data collecting processor collecting a list of cars that are available for trade or sale from a second dealer and/or an auction house and storing said list of cars in said database;
- a sales module operably connected to said database and said inventory analysis module, said sales module adapted to identify cars on said list of cars that are in the one or more identified categories of understocked cars; and
- a user interface module operably connected to said database and said sales module, said user interface module adapted to provide computer access to said dealer and to said second dealer and/or said auction house to the list of identified cars and their owners.

* * * * *